US008272464B2

(12) United States Patent
Reinhart et al.

(10) Patent No.: US 8,272,464 B2
(45) Date of Patent: Sep. 25, 2012

(54) MOTOR ASSEMBLY FOR ALTERNATIVE FUEL VEHICLES

(75) Inventors: Timothy J. Reinhart, Brownsburg, IN (US); Kenneth D. Schoch, Greenwood, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 670 days.

(21) Appl. No.: 12/415,689

(22) Filed: Mar. 31, 2009

(65) Prior Publication Data

US 2009/0250274 A1    Oct. 8, 2009

Related U.S. Application Data

(60) Provisional application No. 61/042,584, filed on Apr. 4, 2008.

(51) Int. Cl.
*B60K 1/02* (2006.01)

(52) U.S. Cl. ..................... 180/65.51; 903/906

(58) Field of Classification Search .............. 180/65.51, 180/65.25, 65.31; 903/906
See application file for complete search history.

(56) References Cited

U.S. PATENT DOCUMENTS

| | | | | |
|---|---|---|---|---|
| 5,875,691 A | * | 3/1999 | Hata et al. | 74/661 |
| 5,904,631 A | * | 5/1999 | Morisawa et al. | 475/5 |
| 6,308,794 B1 | * | 10/2001 | Oppitz | 180/65.25 |
| 6,380,653 B1 | * | 4/2002 | Seguchi | 310/112 |
| 6,424,126 B1 | * | 7/2002 | Ohsawa | 322/4 |
| 6,462,430 B1 | * | 10/2002 | Joong et al. | 290/40 C |
| 6,474,428 B1 | * | 11/2002 | Fujikawa et al. | 180/65.25 |
| 6,478,101 B1 | * | 11/2002 | Taniguchi et al. | 180/65.22 |
| 6,481,517 B1 | * | 11/2002 | Kobayashi et al. | 180/65.26 |
| 6,746,354 B1 | * | 6/2004 | Ziemer | 475/5 |
| 6,777,837 B2 | * | 8/2004 | Tsuzuki et al. | 310/67 R |
| 6,910,981 B2 | * | 6/2005 | Minagawa et al. | 475/5 |
| 7,174,978 B2 | * | 2/2007 | Taniguchi et al. | 180/65.1 |
| 7,191,859 B2 | * | 3/2007 | Hashimoto | 180/65.25 |
| 7,268,451 B2 | * | 9/2007 | Hertz et al. | 310/68 B |
| 7,591,748 B2 | * | 9/2009 | Holmes | 475/5 |
| 7,637,333 B2 | * | 12/2009 | Grundl et al. | 180/65.22 |
| 7,954,578 B2 | * | 6/2011 | Kim et al. | 180/65.22 |
| 8,137,229 B2 | * | 3/2012 | Kempf et al. | 475/149 |
| 2004/0077448 A1 | * | 4/2004 | Oshidari et al. | 475/5 |
| 2004/0110592 A1 | * | 6/2004 | Yamauchi et al. | 475/5 |

(Continued)

OTHER PUBLICATIONS

Chinese Patent Office, Chinese Office Action dated Apr. 18, 2012 for Chinese Patent Application No. 200910203942.9.

*Primary Examiner* — Jeffrey J Restifo

(74) *Attorney, Agent, or Firm* — Ingrassia Fisher & Lorenz, P.C.

(57) ABSTRACT

An automotive drive assembly includes a housing configured to be installed in an automobile, a first electric motor component coupled to the housing, a second electric motor component rotatably coupled to the first electric motor component, the first and second electric motor components jointly including at least one magnet and at least one conductive coil configured such that when current flows through the at least one conductive coil, the second electric motor component rotates relative to the first electric motor component, and a transmission assembly including at least one gear coupled to the second electric motor component such that the rotation of the second electric motor component causes movement of the at least one gear. The second electric motor component and the transmission assembly are coupled to the housing such that the transmission assembly substantially supports the second electric motor component when the housing is installed in the automobile.

11 Claims, 6 Drawing Sheets

U.S. PATENT DOCUMENTS

| | | |
|---|---|---|
| 2005/0037883 A1* | 2/2005 | Motoike et al. .................... 475/5 |
| 2005/0045445 A1* | 3/2005 | Van Heteren et al. .......... 192/94 |
| 2005/0124449 A1* | 6/2005 | Moeller ............................ 475/5 |
| 2005/0133286 A1* | 6/2005 | Oshidari ...................... 180/65.2 |
| 2008/0093135 A1* | 4/2008 | Nomura et al. .............. 180/65.2 |
| 2009/0302720 A1* | 12/2009 | Chiba ......................... 310/75 R |

\* cited by examiner

MOTOR ASSEMBLY FOR ALTERNATIVE FUEL VEHICLES

CROSS-REFERENCE TO RELATED APPLICATIONS

This application claims the benefit of U.S. Provisional Application No. 61/042,584, filed Apr. 4, 2008.

TECHNICAL FIELD

The present invention generally relates to alternative fuel vehicles, and more particularly relates to a motor assembly for alternative fuel vehicles.

BACKGROUND OF THE INVENTION

In recent years, advances in technology, as well as ever-evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use one or more electric motors, perhaps in combination with another actuator, to drive the wheels.

Often, particularly in hybrid vehicles, the electric motor (including a stator and a rotor) is enclosed within a relatively large case, or "can housing." This assembly is typically purchased by the automobile manufacturer from another party, which separately purchases and assembles the individual components, before selling the completed assembly to the automobile manufacturer. Purchasing such a large, complex component from a supplier significantly increases the manufacturing costs of the vehicles.

Additionally, as the power and performance demands on alternative fuel vehicles continue to increase, there is an ever increasing need to maximize the efficiency of the various systems within the vehicles, as well as reduce the overall costs of the vehicles. Moreover, there is a constant desire to reduce the space required by the components in order to minimize the overall cost and weight of the vehicles.

Accordingly, it is desirable to provide an improved method and system for installing an electric motor in an alternative fuel vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, an automotive drive assembly is provided. The automotive drive assembly includes a housing configured to be installed in an automobile, a first electric motor component coupled to the housing, a second electric motor component rotatably coupled to the first electric motor component, the first and second electric motor components jointly including at least one magnet and at least one conductive coil configured such that when current flows through the at least one conductive coil, the second electric motor component rotates relative to the first electric motor component, and a transmission assembly including at least one gear coupled to the second electric motor component such that the rotation of the second electric motor component causes movement of the at least one gear. The second electric motor component and the transmission assembly are coupled to the housing such that the transmission assembly substantially supports the second electric motor component when the housing is installed in the automobile.

In another embodiment, an automotive drive assembly is provided. The automotive drive assembly includes a housing configured to be installed in an automobile in a predefined orientation, a first electric motor component coupled to the housing, a second electric motor component rotatably coupled to the first electric motor component, the first and second electric motor components jointly including at least one magnet and at least one conductive coil configured such that when current flows through the at least one conductive coil, the second electric motor component rotates relative to the first electric motor component, and a transmission assembly including at least one gear coupled to the second electric motor component such that the rotation of the second electric motor component causes movement of the at least one gear. The first electric motor component, the second electric motor component, and the transmission assembly are arranged such that the first electric motor component, the second electric motor component, and the transmission assembly are vertically stacked when the housing is installed in the automobile in the predefined orientation.

In a further embodiment, an automotive drive assembly is provided. The automotive drive assembly includes a housing, a stator casing connected to the housing, an electric motor stator connected to and at least partially positioned within the stator casing, a transmission assembly coupled to the housing and comprising at least one gear, a rotor hub substantially supported by the transmission assembly, and an electric motor rotor connected to the rotor hub such that the electric motor stator and the electric motor rotor jointly form an electric motor comprising at least one magnet and at least one conductive coil arranged such that when current flows through the at least one conductive coil, the electric motor rotor rotates relative to the electric motor stator.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-6 are merely illustrative and may not be drawn to scale.

According to one aspect of the present invention, an automotive drive assembly is provided. The drive assembly includes a motor with separate, modular components. The separate pieces may be outsourced independently, thus reducing costs compared to buying a complete motor assembly. The modular design allows a gear carrier to be positioned directly underneath the motor assembly which saves horizontal (or axial) space.

According to another aspect of the present invention, the automotive drive assembly includes a housing configured to be installed in an automobile. A first electric motor component is coupled to the housing, and a second electric motor component is rotatably coupled to the first electric motor component. The first and second electric motor components jointly include at least one magnet and at least one conductive coil configured such that when current flows through the at least one conductive coil, the second electric motor component rotates relative to the first electric motor component. A transmission assembly including at least one gear is coupled to the second electric motor component such that the rotation of the second electric motor component causes movement of the at least one gear. The second electric motor component and the transmission assembly are coupled to the housing such that the transmission assembly substantially supports the second electric motor component when the housing is installed in the automobile. In one embodiment, the first and second electric motor components are vertically aligned when the housing is installed in an automobile.

Figure 1:
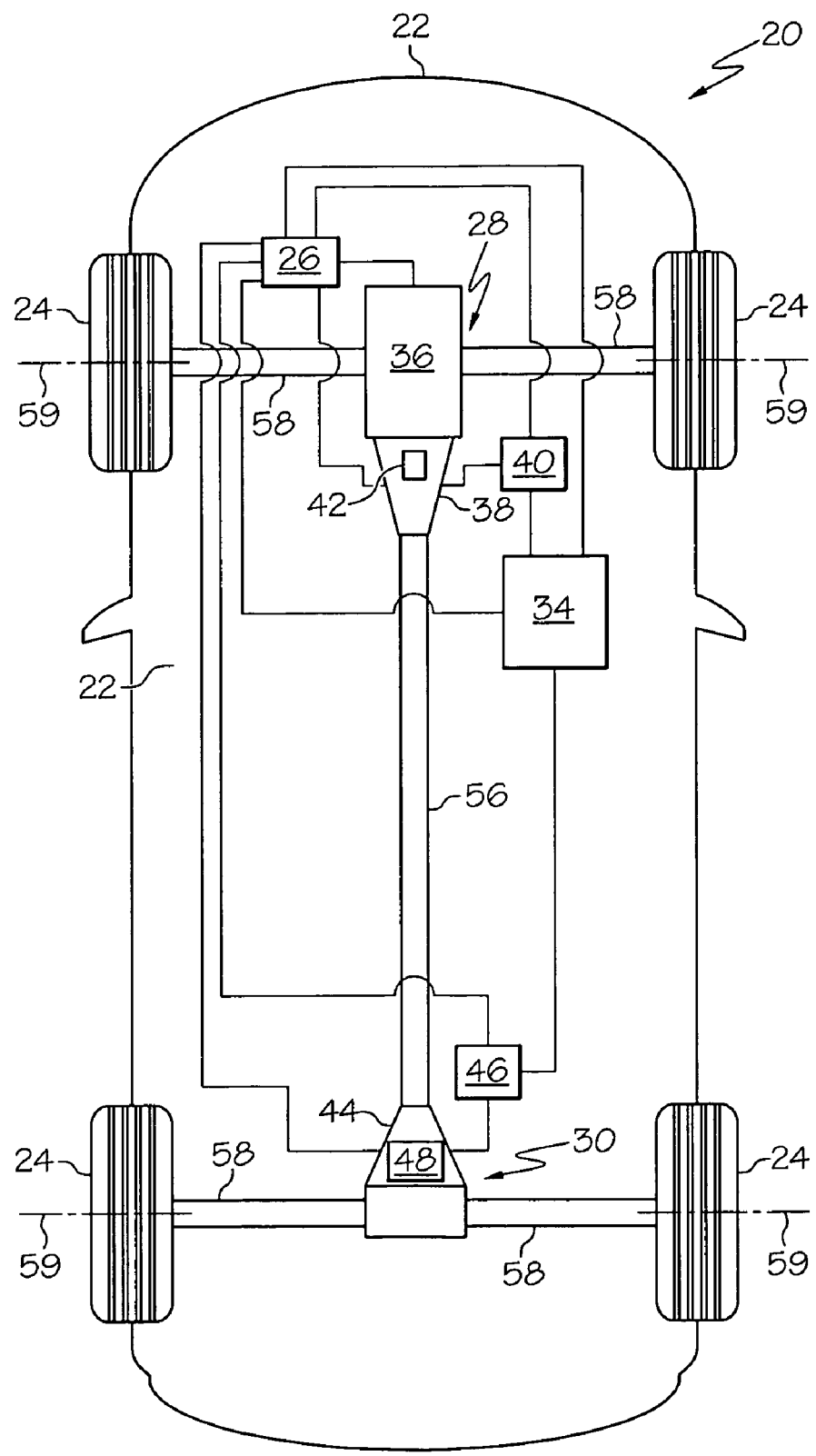
FIG. 1 is a schematic view of an exemplary automobile according to one embodiment of the present invention.

FIG. 1 illustrates an electric vehicle (or automobile) 20, according to one embodiment of the present invention. The automobile 20 includes a frame 22, four wheels 24, and an electronic control system 26. Although not specifically shown, the frame includes a chassis and a body arranged on the chassis that substantially encloses the other components of the automobile 20. The wheels 24 are each rotationally coupled to the frame 22 near a respective corner thereof.

The automobile 20 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 20 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 20 is an AWD hybrid vehicle, and further includes a forward actuator assembly 28, a rear actuator assembly 30, and a battery (i.e., direct current (DC) power supply) 34. The forward actuator assembly 28 includes an internal combustion engine 36, a forward motor/transmission assembly 38, and a forward power inverter assembly 40 (or Traction Power Inverter Module (TPIM)).

The forward motor/transmission assembly 38 includes a transmission therein that is integrated with one (or more) motor/generator (or motor) 42, as is commonly understood, and is coupled to the combustion engine 36. The motor/generator 42 includes a stator assembly and a rotor assembly, as described in greater detail below. The rear actuator assembly 30 includes a rear motor/transmission assembly 44 and a rear power inverter 46 (or Rear Power Inverter Module (RPIM)).

With continued reference to FIG. 1, the rear actuator assembly 30 is coupled to the forward actuator assembly 28 through a main (or drive) shaft 56, and each of the actuator assemblies 28 and 30 are coupled to the wheels 24 through multiple axles 58. As such, each of the wheels 24 is coupled to the frame 22 in such a way that it is rotatable about a respective wheel axis 59.

Although not shown, the forward and rear inverters 40 and 46 each include, in one embodiment, a three-phase circuit coupled to a voltage source and a motor. More specifically, the inverters 40 and 46 each include a switch network having a first input coupled to the battery 34 and an output coupled to the motor/generator(s) 42 and 48. Although a single voltage source (e.g., the battery 34) is shown, a distributed direct current (DC) link with two series sources may be used. The switch networks may include three pairs of series switches with antiparallel diodes (i.e., antiparallel to each switch) corresponding to each of the phases of the operation of the motors 42 and 48.

Referring again to FIG. 1, the electronic control system 26 is in operable communication with the forward actuator assembly 28, the rear actuator assembly 30, the battery 34, and the inverters 40 and 46. Although not shown in detail, the electronic control system 26 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

In one embodiment, the automobile 20 is a "series HEV," in which the combustion engine 36 is not directly coupled to the transmission(s), but coupled to the motors 42 and 48 and is used to actuate the motors 42 and 48 to generate electric power. In another embodiment, the automobile 20 is a "parallel HEV," in which the combustion engine 36 is directly coupled to the transmission(s) by, for example, having the rotor of the electric motor(s) rotationally coupled to the drive shaft of the combustion engine 36.

During operation, still referring to FIG. 1, the automobile 20 is operated by providing power to the wheels 24 with the combustion engine 36 and the electric motors 42 and 48 in an alternating manner and/or with the combustion engine 36 and the electric motors 42 and 48 simultaneously. In order to power the electric motors 42 and 48, DC power is provided from the battery 34 to the inverters 40 and 46, which convert the DC power to AC power, prior to energizing the electric motors 42 and 48.

Figure 2:
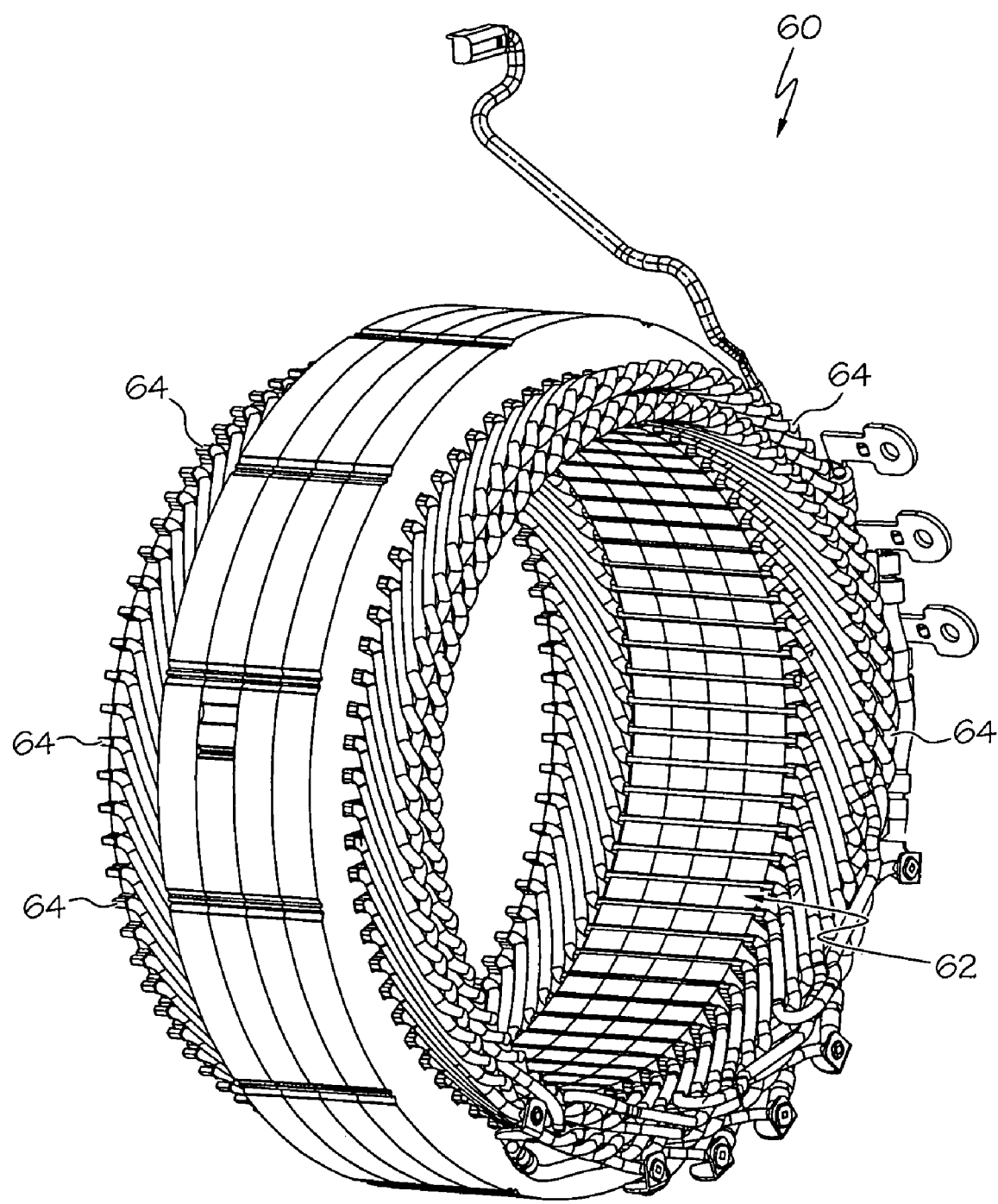
FIG. 2 is an isometric view of a stator assembly.
Figure 3:
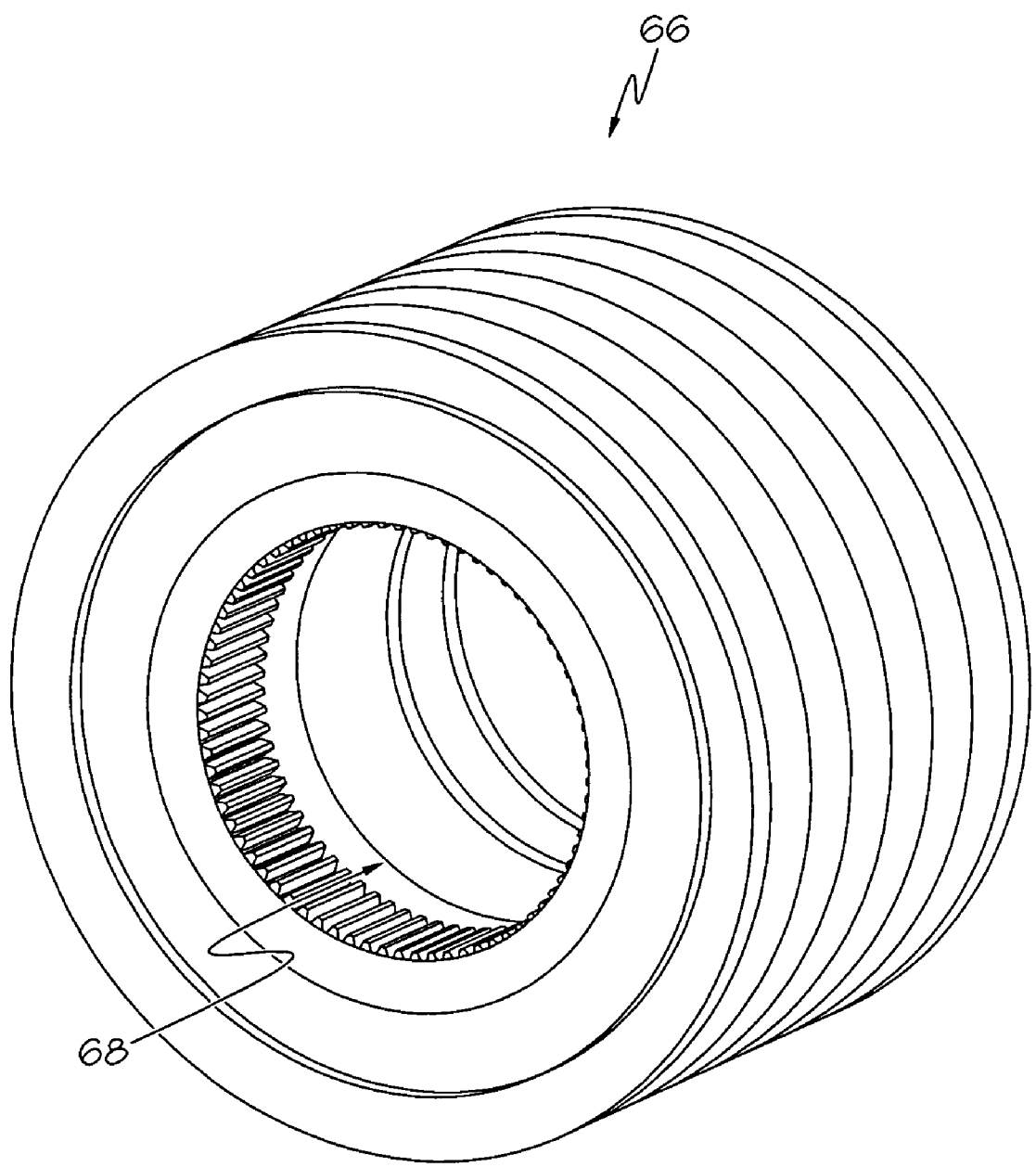
FIG. 3 is an isometric view of a rotor assembly.

FIGS. 2-5 illustrate various components of the forward actuator assembly 28, according to one embodiment of the present invention. FIG. 2 illustrates a stator assembly (or stator) 60 of motor 42. As shown, the stator 60 is substantially annular in shape with a rotor opening 62 therethrough and includes a plurality of conductive coils 64, as is commonly understood. FIG. 3 illustrates a rotor assembly (or rotor) 66. The rotor 66 is substantially annular in shape with a shaft opening 68 therethrough and includes a ferromagnetic core, as is commonly understood. Although not specifically shown, the rotor 66 may have an outer diameter similar to (or slightly smaller than) a diameter of the rotor opening 62 through the stator 60 (FIG. 2). As is described below, the stator 60 and the rotor 66 jointly form a motor (e.g., motor 42), which may include multiple electromagnetic poles (e.g., sixteen poles), as is commonly understood.

Figure 4:
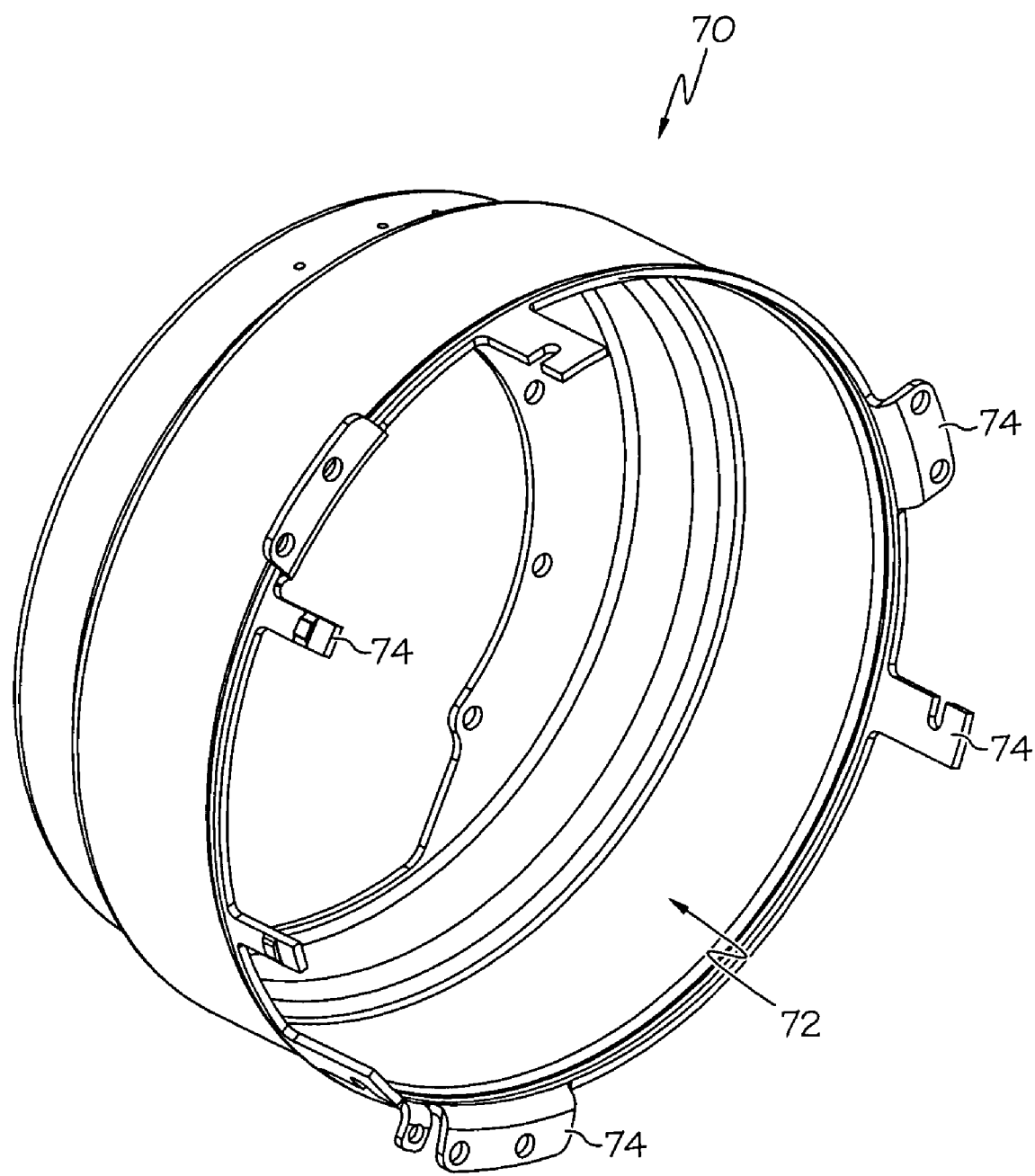
FIG. 4 is an isometric view of a stator case.
Figure 5:
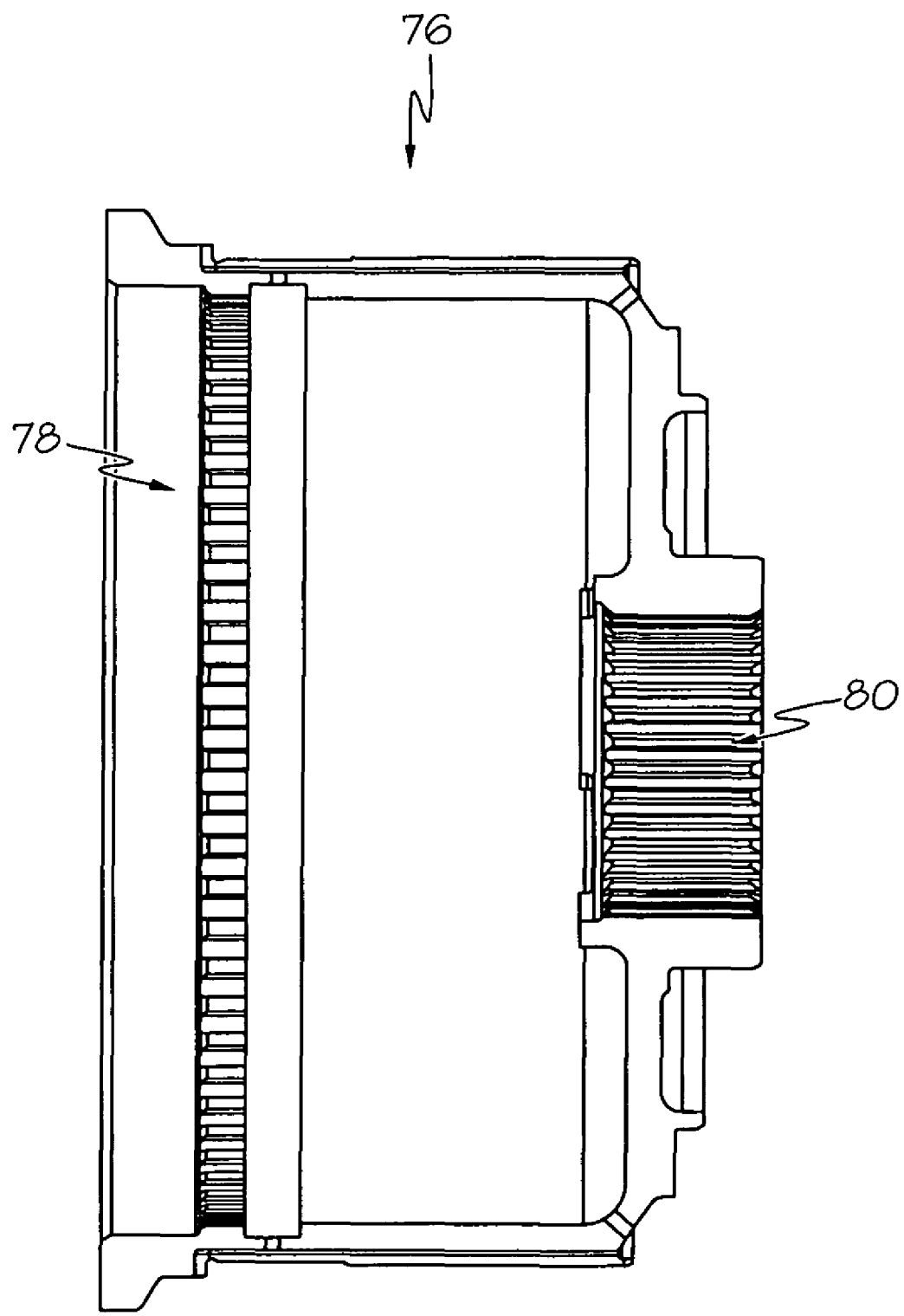
FIG. 5 is a cross-sectional side view of a rotor hub.

FIG. 4 illustrates a stator casing, or stator can housing, 70. The stator can housing 70 is substantially annular, or cylindrical, in shape with a stator opening (or cavity) 72 extending therethrough. Although not specifically shown, the stator opening 72 may have a diameter similar to (or slightly smaller than an outer diameter of the stator 60 (FIG. 2). The stator can housing 70 also includes a plurality of attachment formations 74 (e.g., for installation into the vehicle and/or transportation) on one end thereof. FIG. 5 illustrates a rotor hub 76. Although only shown in cross-section, the rotor hub 76 is substantially annular in shape (similar to the can housing 70) with a rotor cavity 78 on one side thereof and a shaft opening 80 on an opposing side thereof.

Figure 6:
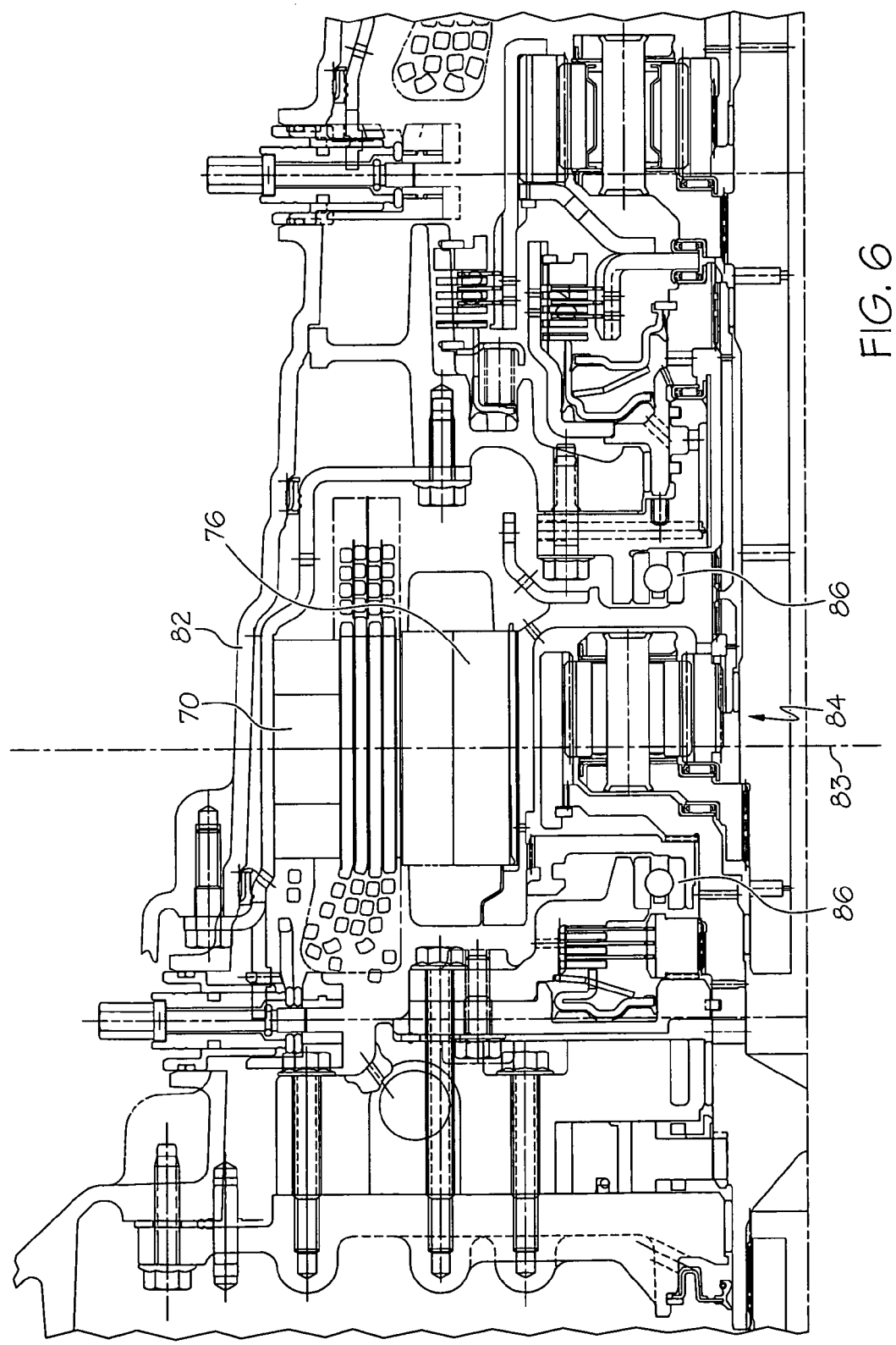
FIG. 6 is a cross-sectional side view of a transmission case within the automobile of FIG. 1 with the stator assembly of FIG. 2, the rotor assembly of FIG. 3, and stator case of FIG. 4, and the rotor hub of FIG. 5 installed therein.

According to one aspect of the present invention, the motor components 60, 66, 70, and 76 are modularly installed into the automobile 20 (FIG. 1). In particular, the stator 60 and the rotor 66 are separately installed into the automobile 20 without the casing that typically encloses the motor components. FIG. 6 illustrates a transmission case (or housing) 82 within the automobile 20, according to one embodiment, in which the stator 60 and the rotor 66 may be installed. Although not specifically shown, the transmission case 82 may have various transmission and/or motor components (e.g., clutches, shafts, and/or the rear motor 48) associated with the rear actuator assembly 30 (FIG. 1) installed therein prior to the installation of the stator 60 and the rotor 66.

The stator 60 (FIG. 2) is first connected to the can 70 within the stator opening 72 (e.g., the stator 60 is press fit into the stator opening 72). Referring to FIG. 6, the stator can housing 70 is then secured within the transmission case 82 at an upper portion thereof The rotor 66 (FIG. 3) is connected to the rotor hub 76 within rotor cavity 78 (e.g., the rotor 66 is press fit onto the rotor hub 76). The rotor hub 76 is then positioned within the transmission case 82 below the stator can housing 70 (and the stator 60) such that the rotor 66 is inserted into the rotor opening 62. During operation, the rotor 66 rotates relative to the stator 60 (and/or the frame 22) about a rotor axis 83.

Transmission components associated with the forward actuator assembly 28 are then installed into the transmission case 82, including a gear carrier 84 (e.g., a transmission assembly including a series of planetary gears) positioned below and coupled to the rotor hub 76 via a shaft (not shown) and bearings 86. Of particular interest is that the rotor hub 76 (and the rotor 66) is supported by transmission components (e.g., the gear carrier 84) as opposed to a casing that encloses only the stator 60 and the rotor 66, as there is no such casing in at least one embodiment of the present invention. The transmission case 82 is then installed into the automobile 20 in a predefined orientation as shown in FIG. 6 such that the stator can housing 70, the rotor hub 76, and the gear carrier (or transmission assembly) 84 are vertically "stacked", or vertically aligned, along the rotor axis 83. Thus, the rotor axis 83 extends through the stator can housing 70, the hub 76, and the gear carrier 84 and is orthogonal to (e.g., perpendicular to and does not intersect) the wheel axes 59 (FIG. 1). That is, the stator 60 and the rotor 66 are arranged in the transmission case 82 such that when the transmission case 82 is installed in the automobile 20, the rotor axis is substantially vertical when the automobile 20 is on a substantially horizontal surface that is, in at least one embodiment, One advantage of the motor assembly described above is that because of the individual, separate components the motor may be manufactured modularly. That is, the production of the various components may be outsourced to multiple manufacturers, resulting in a reduction of costs. Another advantage is that the modular components result in a more compact assembly in which the gear carrier may be position below the stator and the rotor. That is, the stator, the rotor, and the carrier may be vertically aligned, thus reducing the amount of horizontal (i.e., axial) space required for the motor assembly and the transmission.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes stator can housing be made in the function and arrangement of elements without departing from the scope of the invention as set forth in the appended claims and the legal equivalents thereof.

What is claimed is:

1. A modular automotive drive assembly comprising:
   a housing configured to be installed in an automobile;
   a stator assembly, comprising:
      a stator casing having a plurality of attachment formations for coupling the stator assembly to the housing; and
      a stator press-fit into the stator casing;
   a rotor assembly, comprising:
      a rotor hub; and
      a rotor press-fit onto the rotor hub;
   a transmission assembly coupled to the housing via a bearing assembly and comprising at least one gear coupled to the rotor assembly such that the rotation of the rotor assembly causes movement of the at least one gear,
   wherein the stator assembly is coupled to the housing and the rotor assembly is supported in rotational alignment with the stator assembly by the bearing assembly of the transmission assembly each of which may be independently installed in the housing of the modular automotive drive assembly.

2. The modular automotive drive assembly of claim 1, wherein the rotor assembly is rotationally coupled to the stator assembly without a separate casing substantially enclosing the stator assembly and rotor assembly.

3. The modular automotive drive assembly of claim 1, wherein the stator assembly, the rotor assembly, and the transmission assembly are vertically aligned when the housing is installed in the automobile.

4. The modular automotive drive assembly of claim 3, wherein the rotor assembly is rotatable relative to the stator assembly about an axis, and the axis extends through the stator assembly and the transmission assembly.

5. The modular automotive drive assembly of claim 4, wherein the axis is substantially vertical when the housing is installed in the automobile and the automobile is on a substantially horizontal surface.

6. The modular automotive drive assembly of claim 4, wherein the transmission assembly is located below the stator assembly and the rotor assembly.

7. The modular automotive drive assembly of claim 6, wherein the stator assembly is at least partially positioned within the stator casing.

8. A modular automotive drive assembly comprising:
- a housing configured to be installed in an automobile in a predefined orientation;
- a first electric motor component coupled to the housing, the first electric motor component comprising:
  - a stator casing having a plurality of attachment formations for coupling the stator assembly to the housing; and
  - a stator press-fit into the stator casing;
- a second electric motor component rotatably coupled to the first electric motor component, the second electric motor component comprising:
  - a rotor hub; and
  - a rotor press-fit onto the rotor hub; and
- a transmission assembly comprising at least one gear coupled to the second electric motor component such that the rotation of the second electric motor component causes movement of the at least one gear,
- wherein the transmission assembly is coupled to the housing by a bearing assembly and the second electric motor component is supported by the transmission assembly each of which may be independently installed in the housing of the modular automotive drive assembly.

9. The modular automotive drive assembly of claim 8, wherein the automotive drive assembly supports the first and second electric motor components without a separate casing enclosing the first and second electric motor components.

10. The modular automotive drive assembly of claim 8, wherein the transmission assembly is located below the first and second electric motor components.

11. The modular automotive drive assembly of claim 10, wherein the stator of the first electric motor component is at least partially positioned within the stator casing without the stator casing enclosing the second electric motor component.

* * * * *